June 4, 1968  Y. E. MOOCHHALA ET AL  3,386,342
VARIABLE STROKE FLUID DRIVE
Filed Aug. 28, 1967   2 Sheets-Sheet 1
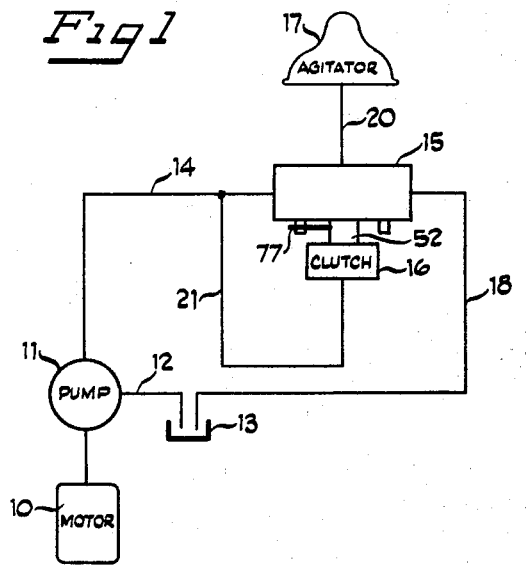
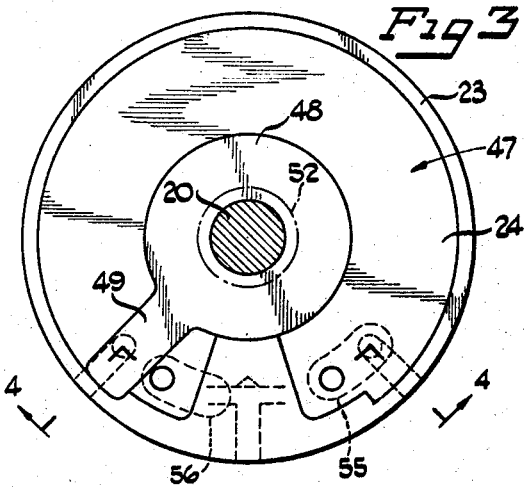
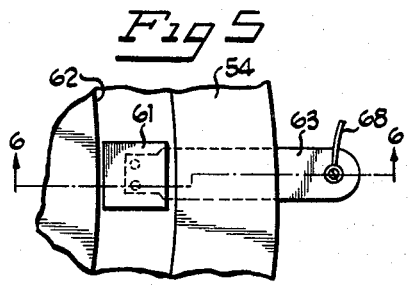
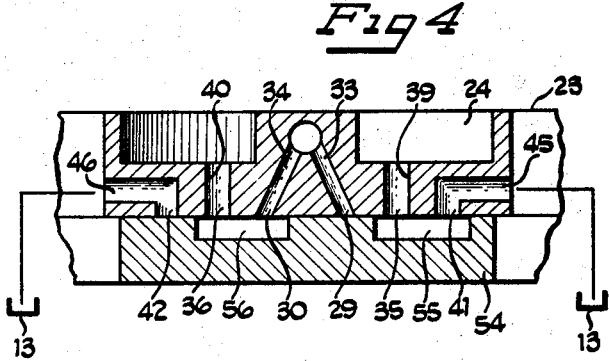
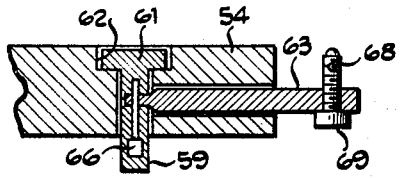
INVENTORS
YUNUS E. MOOCHHALA
HERBERT N. UNDERWOOD
BY Robert L. Zieg
ATTORNEY

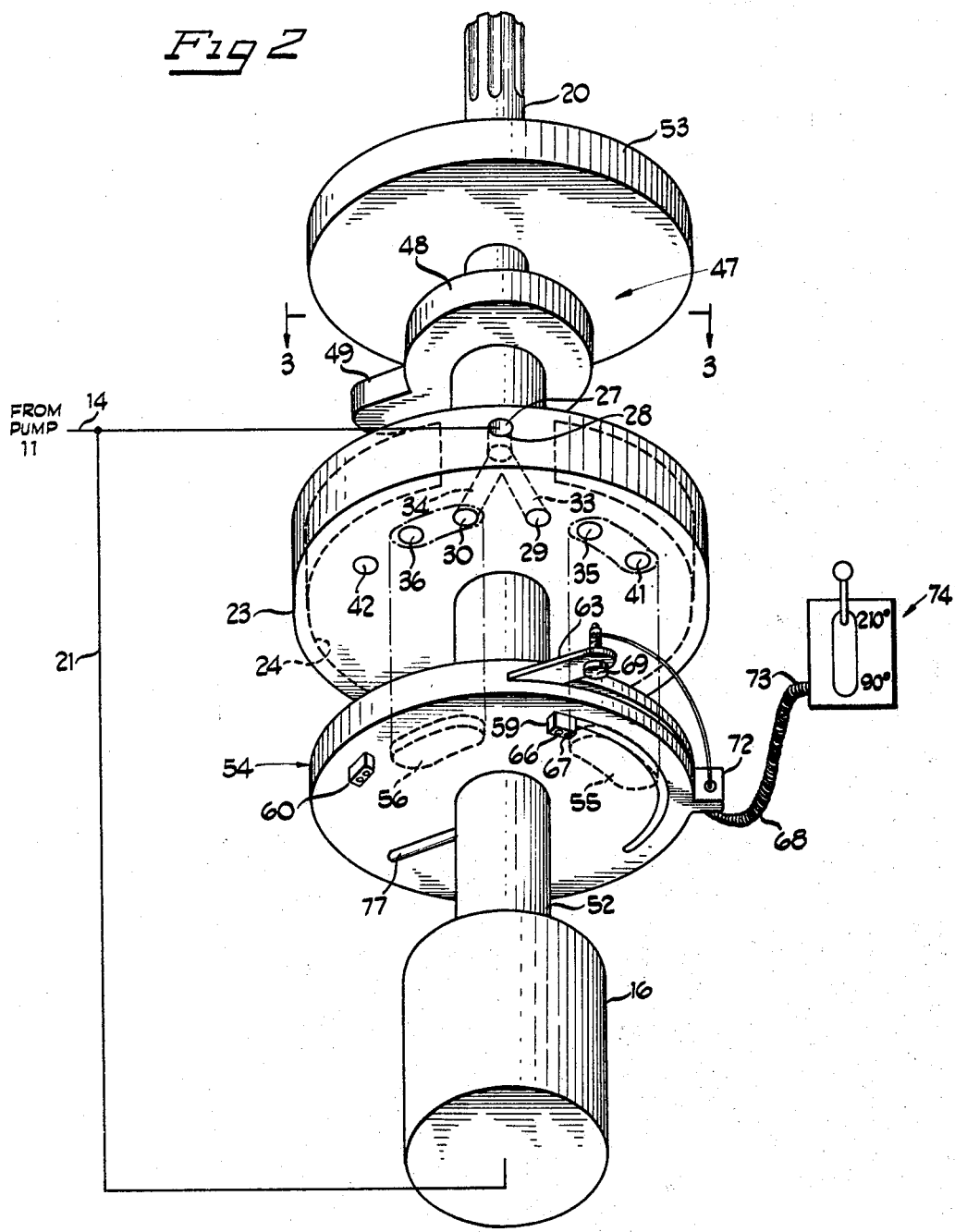

3,386,342
VARIABLE STROKE FLUID DRIVE
Yunus E. Moochhala, Bombay, India, and Herbert N. Underwood, Chicago, Ill., assignors to Borg-Warner Corporation, Chicago, Ill., a corporation of Illinois
Filed Aug. 28, 1967, Ser. No. 663,803
6 Claims. (Cl. 91—277)

ABSTRACT OF THE DISCLOSURE

A fluid motor, acting in cooperation with a fluid pump, which motor is adapted to drive the agitator of an automatic washing machine including valving adapted to vary the length of stroke of the agitator in response to a control mechanism remote from the motor.

Summary of the invention

This invention relates to oscillatory fluid motors and more particularly to an oscillatory fluid motor having a stroke of variable length. Most prior art motors which have provision for varying the length of stroke of an oscillating member require the member to be at rest when the adjustment is made. The change of stroke length also normally requires a partial dismantling or disassembly of the motor to accomplish the adjustment.

The present invention overcomes these objections by providing an adjustment which is infinitely variable between two predetermined stroke lengths by the positioning of a control lever remote from the agitator drive. The adjustment can be effected with the system in operation or at rest and requires no disassembly of any part of the system.

The desirability of varying the length of stroke of an oscillatory motor becomes obvious when applying this concept to specific systems. In a washing machine it would be desirable to vary the length of stroke of the agitator depending upon the type of fabric being washed. For coarse or rough fabrics capable of withstanding vigorous agitation, a short, choppy stroke would be desirable. For more delicate fabrics, a longer, smoother stroke would be preferable. It would also be advantageous to have intermediate stroke lengths to accommodate a wide range of fabrics.

Brief description of the drawings

Referring now to the drawings:

FIGURE 1 is a schematic view of a fluid circuit in which the oscillatory motor of the present invention may be utilized;

FIGURE 2 is an exploded isometric view of an oscillatory motor embodying the principles of the invention;

FIGURE 3 is a top view of the oscillatory motor;

FIGURE 4 is a section view taken along the line 4—4 of FIGURE 3;

FIGURE 5 is a partial top view showing details of the speed control mechanism;

FIGURE 6 is a section view taken along the line 6—6 of FIGURE 5;

Description of the preferred embodiment

There is shown in FIGURE 1 a fluid circuit utilizing a variable stroke oscillatory motor constructed in accordance with the principles of the present invention. For purposes of illustration, a variable stroke oscillatory motor is shown in connection with a system for operating an agitator such as agitator 17 of FIGURE 1 which comprises a part of an automatic washing machine (not shown). This arrangement is purely for purposes of illustration of the inherent advantages of the invention and should not be considered as a limitation of the scope of its application. It must be understood that the variable stroke oscillatory motor may be utilized in any system requiring means for providing oscillation of an element of the system and control of the length of the oscillatory stroke.

As best seen in FIGURE 1, a system is shown for driving an agitator 17 of a washing machine (not shown). For this purpose an electric motor 10 is shown connected to drive a fluid pump 11. The pump 11 has fluid inlet conduit 12 in fluid communication with a sump 13 and a fluid pressure outlet conduit 14 supplying fluid under pressure to an oscillatory fluid motor 15 which drives the agitator 17. The oscillatory motor 15 is operably associated with a clutch 16 which transmits the oscillatory motion to the agitator 17 through a shaft 20 drivingly connectible thereto. The motor 15 exhausts fluid to the sump 13 through a conduit 18. The clutch 16 is included for illustration of a system adapted to drive both an agitator and a spin basket hydraulically in which the agitator must be able to freely rotate in the spin cycle and such a clutch is not essential to this embodiment.

Conduit 21 is provided to communicate fluid under pressure from conduit 14 to the hydraulically actuated clutch 16 which, when fluid pressure is applied thereto, will orient the system in an operative position for the agitate portion of the washing cycle and when the fluid pressure is released will allow the system to assume an orientation operative to perform the spin portion of the washing cycle, uncoupling the agitator 17 from the oscillatory motor 15.

Referring now to FIGURE 2, the oscillatory motor 15 includes a housing 23 defining a chamber 24. The housing 23 receives fluid from conduit 14 through a port 27 in fluid communication with a first fluid conduit 28 as best seen in FIGURE 4. A first pair of ports 29 and 30 are formed in the housing 23 in fluid communication with the fluid conduit 28 through fluid conduits 33 and 34 respectively. A second pair of ports 35 and 36 are formed in the housing 23 in fluid communication with the chamber 24 through fluid conduits 39 and 40 respectively as shown in FIGURE 4. A third pair of exhaust ports 41 and 42 are formed in the housing 23 in fluid communication with the sump 13 through fluid conduits 45 and 46 also shown in FIGURE 4.

FIGURE 3 shows that within chamber 24 is mounted a rotary actuator 47 having an integral hub section 48 and a vane 49 dividing the chamber 24 into high and low pressure portions. The rotary actuator 47 is affixed to an output shaft 52 concentric with and of larger diameter than shaft 20, which output shaft extends through the housing 23 and is operably associated with the agitator 17 in the agitate cycle, being coupled to shaft 20 through clutch 16 in a manner well known in the art and shown in copending application S.N. 538,434 of common assignee.

Referring back to FIGURE 2 a cover plate 53 is provided in contact with the housing 23 and acts as a seal for it. A rotary valve 54 containing a pair of spaced apart arcuate grooves 55 and 56 is shown adapted to contact the housing 23 and serves to selectively communicate fluid pressure from one of said first pair of ports 29 or 30 to one of said second pair of ports 35 or 36 and from the other of said second pair of ports 35 or 36 to one of said exhaust ports 41 or 42.

A pair of stops 59 and 60 is shown extending downwardly from the surface of the rotary valve 54 at least one of which stops 59 is movable about the surface of the rotary valve. Each movable stop is attached to a T-shaped slider 61 as shown in FIGURES 5 and 6 which is adapted to rotate about the axis of the rotary valve 54 in a T-shaped slot 62 formed in the rotary valve 54. An arm 63 is shown affixed to the slider 61 and extending radially from the valve plate 54. A pair of cap screws 66 and 67 serve to hold the movable stop 59, the slider 61 and the arm 63 in a rigid subassembly with respect to each other.

A Bowden wire 68 or any other suitable cable means is connected at one end 69 to the arm 63 and runs through a guide and retainer 72 attached to the rotary valve 54. The other end 73 of the Bowden wire 68 is connected to a stroke control mechanism 74 positioned remotely from the rotary valve 54 such that positioning of the stroke control mechanism 74 will exert either a push or pull on the Bowden wire 68 which force will be exerted on the arm 63 thereby rotating the movable stop 59 to a position either closer to or farther from the fixed stop 60 depending upon whether the length of stroke is to be decreased or increased.

Extending radially from the output shaft 52 is an actuating arm 77 adapted to contact the stops 59 and 60 for rotation of the rotary valve 54.

In operation, when the electric motor 10 is activated for the agitate cycle it drives the pump 11 so as to draw fluid from the sump 13 through the fluid inlet conduit 12. The pump 11 delivers the fluid under pressure through the fluid outlet conduit 14 which communicates fluid to the oscillatory motor 15. Fluid is delivered to the hydraulic clutch 16 through fluid conduit 21 which couples the shafts 20 and 52 for driving the agitator 17.

Fluid enters the housing 23 through port 27, flows through conduit 28 and is communicated to ports 29 and 30 through conduits 33 and 34. Depending on the initial position of rotary valve 54, one of the ports 29 or 30 will be in fluid communication with the chamber 24, the other will be closed to fluid flow. For the sake of description assume that the initial position of rotary valve 54 is that shown in FIGURE 2 with groove 56 oriented to communicate fluid between port 30 and port 36 and groove 55 communicating fluid from port 35 to port 41.

Fluid now flows into chamber 24 through conduit 40 and acts against vane 49 causing the rotary actuator 47 to rotate in a clockwise direction as viewed from above. Since the rotary actuator 47 is affixed to the output shaft 52 the rotation of the rotary actuator 47 results in a corresponding rotation of the output shaft 52 and the actuating arm 77 attached thereto.

The actuating arm 77 will contact the stop 59 and cause the rotary valve 54 to rotate until port 36 is in communication with sump 13 and port 35 is in communication with port 29 through groove 55.

At this point, fluid now flows through conduit 39 into chamber 24 and acts against vane 49 to urge the rotary actuator 47 to rotate in a counterclockwise direction as viewed from the top. The fluid in the low pressure portion is forced through conduit 40 to groove 56 and from there to sump 13 through conduit 46.

Rotation of the rotary actuator 47, shaft 52, actuating arm 77 and output shaft 20 continues in the counterclockwise direction until the actuating arm 77 strikes the stop 60 effecting a rotation of the rotary valve 54, reversing the travel of the rotary actuator 47 and beginning another cycle.

It will now become obvious that the length of the arc which the vane 49 describes and, therefore, the length of the agitator stroke depends upon the arcuate distance which the actuating arm 77 must travel between the contact edges of stops 59 and 60. By selectively positioning the movable stop 59 through stroke control mechanism 74, the arcuate distance between stops 59 and 60 may be increased or decreased by moving the stops farther apart or closer together. There must, however, be sufficient frictional contact between the T slider 61 and the groove 62 to preclude relative movement between the stop 59 and the rotary valve 54 when the stop is struck by the actuating arm 77. It would, of course, be obvious that both stops could be made movable in response to a single movement of the control mechanism but from an economical standpoint it is felt that providing one fixed stop and one movable stop is preferred.

The stroke length of the agitator may be infinitely varied between a predetermined minimum and maximum which points depend mainly on the design characteristics of the chamber, porting and rotary valve but end limits of 90° minimium arc and 210° maximum arc provide an adequate range of stroke lengths for most fabrics and conditions.

It will be apparent that the present invention advantageously provides an oscillatory fluid motor having a stroke of infinitely variable length between a predetermined minimum and maximum. The stroke length of the present motor can be selected or varied by controls remote from the oscillatory motor itself and this adjustment can be made while the motor is at rest or in operation without necessitating disassembly of any part of the system.

While a preferred embodiment of the invention has been specifically disclosed in the form of an agitator motor for a washing machine, it is to be understood that the principles of the invention could be as easily applied to fluid motors for other devices as is apparent to those skilled in the art. Therefore, the invention is to be given its broadest interpretation within the scope of the following claims.

What is claimed is:

1. A variable stroke mechanism for controlling the length of the oscillatory stroke imparted to an element of a system by an oscillatory motor comprising: a housing defining a chamber; a rotary actuator journalled for rotation within said chamber including a vane dividing said chamber into high and low pressure portions; an output shaft connected to said rotary actuator extending through said chamber connectible to said element; valve means in contact with said housing for alternately communicating fluid pressure to either side of said vane; a pair of stops attached to said valve means at least one of said stops being movable with respect to said valve means; actuating means connected to said output shaft adapted to contact said stops and change the orientation of said valve means with respect to said housing thereby effecting reversal of the rotation of said rotary actuator whereby the arc through which said actuating means travels is determined by the arcuate distance between said stops; control means remotely positioned from and associated with said movable stop adapted to selectively vary the arcuate distance between said movable stop and said other stop thereby varying the arc through which said actuating means and said output shaft travels.

2. A variable stroke mechanism as in claim 1 wherein said valve means includes a rotary valve and a pair of grooves in said rotary valve whereby each of said grooves is adapted to communicate fluid from a fluid pump to said chamber or from said chamber to a sump depending upon the orientation of said rotary valve.

3. A variable stroke mechanism as in claim 1 wherein said control means includes an arm radially extending from said valve means connected to said movable stop; and cable means attached at one end to said arm and at the other end to a stroke control mechanism located remotely from said rotary valve whereby said movable stop will increase or decrease its arcuate distance from said fixed stop in response to positioning of said stroke control mechanism and thereby increase or decrease the stroke length of said rotary actuator.

4. A variable stroke mechanism for controlling the length of the oscillatory stroke imparted to an agitator of a washing machine by an oscillatory motor comprising: a housing defining a chamber; a rotary actuator journalled for rotation within said chamber including a vane dividing said chamber into high and low pressure portions; an output shaft connected to said rotary actuator extending from said chamber adapted to be drivingly associated with said agitator; valve means in contact with said housing for alternately communicating fluid pressure to either side of said vane; a pair of stops attached to said valve means at least one of said stops being movable with respect to said valve means; actuating means connected to said output shaft adapted to contact said stops and change the orientation of said valve means with respect to said housing thereby effecting reversal of the rotation of said rotary actuator whereby the arc through which said actuating means and said agitator travels is determined by the arcuate distance between said stops; control means remotely positioned from and associated with said movable stop adapted to selectively vary the distance between said movable stop and said other stop thereby varying the arc through which said actuating means and said agitator travel.

5. A variable stroke mechanism as in claim 4 wherein said valve means includes a rotary valve and a pair of grooves in said rotary valve whereby each of said grooves is adapted to communicate fluid from a fluid pump to said chamber or from said chamber to a sump depending upon the orientation of said rotary valve.

6. A variable stroke mechanism as in claim 4 wherein said control means includes an arm radially extending from said valve means connected to said movable stop and cable means attached at one end to said arm and at the other end to a stroke control mechanism located remotely from said rotary valve whereby said movable stop will increase or decrease its arcuate distance from said fixed stop in response to positioning of said stroke control mechanism and thereby increase or decrease the stroke length of said agitator.

References Cited

UNITED STATES PATENTS

| | | | |
|---|---|---|---|
| 703,569 | 7/1902 | Geele | 91—330 |
| 1,019,388 | 3/1912 | Weber et al. | 91—339 |
| 1,566,075 | 12/1925 | Cotton | 91—279 |
| 2,286,026 | 6/1942 | Towler et al. | 91—330 |
| 2,761,429 | 9/1956 | Krohm | 91—279 |
| 2,811,952 | 11/1957 | Bitzer | 91—339 |

MARTIN P. SCHWADRON, *Primary Examiner.*

PAUL E. MASLOUSKY, *Assistant Examiner.*